(12) United States Patent
Kim

(10) Patent No.: US 8,926,193 B2
(45) Date of Patent: Jan. 6, 2015

(54) OPTICAL CABLE CONNECTION MODULE HAVING FUNCTION OF PREVENTING SEPARATION OF SHUTTER

(75) Inventor: Jeong Bin Kim, Daejeon (KR)

(73) Assignee: Raytron Co., Ltd., Daejeon (KR)

(*) Notice: Subject to any disclaimer, the term of this patent is extended or adjusted under 35 U.S.C. 154(b) by 41 days.

(21) Appl. No.: 13/698,224

(22) PCT Filed: Mar. 10, 2011

(86) PCT No.: PCT/KR2011/001666
§ 371 (c)(1),
(2), (4) Date: Nov. 15, 2012

(87) PCT Pub. No.: WO2012/015137
PCT Pub. Date: Feb. 2, 2012

(65) Prior Publication Data
US 2013/0121646 A1   May 16, 2013

(30) Foreign Application Priority Data
Jul. 27, 2010  (KR) .................. 10-2010-0072285

(51) Int. Cl.
*G02B 6/36* (2006.01)
*G02B 6/38* (2006.01)
(52) U.S. Cl.
CPC ................ *G02B 6/36* (2013.01); *G02B 6/3849* (2013.01); *G02B 6/3893* (2013.01)
USPC .......................................................... 385/77
(58) Field of Classification Search
USPC .......................................................... 385/77
See application file for complete search history.

(56) References Cited

U.S. PATENT DOCUMENTS

| | | | |
|---|---|---|---|
| 6,595,696 B1 * | 7/2003 | Zellak | 385/72 |
| 7,114,856 B2 * | 10/2006 | Ohbayashi et al. | 385/88 |
| 7,329,053 B2 * | 2/2008 | Sohmura et al. | 385/88 |
| 7,419,310 B2 * | 9/2008 | Mizuno | 385/88 |
| 2002/0118931 A1 * | 8/2002 | Ohbayashi et al. | 385/88 |
| 2002/0191921 A1 * | 12/2002 | Satoh | 385/92 |
| 2004/0062486 A1 * | 4/2004 | Tanaka et al. | 385/55 |

FOREIGN PATENT DOCUMENTS

| | | |
|---|---|---|
| JP | 2002-055263 | 2/2002 |
| JP | 2003-322766 | 11/2003 |
| JP | 2004-354672 | 12/2004 |
| JP | 3147103 | 11/2008 |
| KR | 10-2004-0016384 | 2/2004 |
| KR | 10-2005-0024262 | 3/2005 |
| KR | 10-2006-0049321 | 5/2006 |

* cited by examiner

*Primary Examiner* — Sung Pak
(74) *Attorney, Agent, or Firm* — Harness, Dickey & Pierce, P.L.C.

(57) ABSTRACT

The present invention relates to an optical cable connection module having a function of preventing separation of a shutter. The optical cable connection module includes a body configured to have an optical device embedded therein and have U-shaped insertion grooves provided on both sides of the top end of a cable insertion hole on the front side; the shutter disposed in the cable insertion hole of the body and configured to have a rotating shaft provided on both sides of the top end of the shutter, the rotating shaft being inserted into the U-shaped insertion grooves of the body and rotated around the U-shaped insertion grooves; an elastic member disposed in an upper inner portion of the body and configured to have a front end on the front side support the rear of the shutter.

4 Claims, 5 Drawing Sheets

OPTICAL CABLE CONNECTION MODULE HAVING FUNCTION OF PREVENTING SEPARATION OF SHUTTER

TECHNICAL FIELD

The present invention relates to an optical cable connection module and, more particularly, to an optical cable connection module having a function of preventing separation of a shutter, which is capable of preventing alien substances from entering an optical cable connection module body through a cable insertion hole by preventing the shutter, provided in the cable insertion hole of the body, from being separated from the cable insertion hole.

BACKGROUND ART

An optical cable connection module for optical signals is chiefly provided in recent electronic devices.

A common optical cable connection module includes a body, a shutter, and an elastic member. The body has an optical device embedded therein and U-shaped insertion grooves formed on both top sides of a cable insertion hole provided ahead. The shutter is disposed in the cable insertion hole of the body, inserted into the U-shaped insertion grooves of the body, and provided with a rotating shaft. The elastic member is disposed in an inner upper part of the body, and it has a front end supporting the rear of the shutter.

In the optical cable connection module, when an optical cable is inserted into the cable insertion hole of the body, the shutter rotates toward the inside of the body and thus opens the cable insertion hole. When the optical cable is separated from the cable insertion hole of the body, the shutter rotates toward the outside of the body by means of elasticity of the elastic member supporting the rear of the shutter and thus closes the cable insertion hole.

An upper part of the U-shaped insertion grooves of the body is an open state. In the process of opening and closing the shutter, the shutter exits through the upper part of the U-shaped insertion grooves in which the rotating shaft of the shutter is in the open state, and thus the shutter is frequently separated from the cable insertion hole. Accordingly, there are problems in that alien substances are introduced into the body because of the shutter separated from the cable insertion hole and optical signals are not smoothly transmitted.

In order to solve the above problems, attempts are being made to develop an optical cable connection module having a function of preventing the separation of the shutter, which is capable of preventing the shutter from being separated from the cable insertion hole while opening and closing the shutter, but satisfactory results have not yet been achieved.

DISCLOSURE OF INVENTION

Technical Problem

Accordingly, the present invention has been made in view of the above problems, and it is an object of the present invention to provide an optical cable connection module having a function of preventing separation of a shutter, which is capable of preventing alien substances from entering an optical cable connection module body through a cable insertion hole by preventing the shutter, provided in the cable insertion hole of the body, from being separated from the cable insertion hole.

Solution to Problem

To achieve the above object, according to an aspect of the present invention, there is provided an optical cable connection module having a function of preventing a separation of a shutter, including a body configured to have an optical device embedded therein and have U-shaped insertion grooves provided on both sides of the top end of a cable insertion hole on the front side; the shutter disposed in the cable insertion hole of the body and configured to have a rotating shaft provided on both sides of the top end of the shutter, the rotating shaft being inserted into the U-shaped insertion grooves of the body and rotated around the U-shaped insertion grooves; an elastic member disposed in an upper inner portion of the body and configured to have a front end on the front side support the rear of the shutter; and a cover coupled to the outside of the body and configured to include protruding members having respective protrusions provided on both front sides of the top end of the cover, the protrusions being formed to cross the U-shaped insertion grooves of the body. When the shutter rotates toward the inside of the body with the rear of the shutter coming in contact with the front end of the elastic member of a sheet shape, the protrusions formed in the protruding members of the cover prevent an upper portion of the U-shaped insertion grooves of the body from being opened. Accordingly, the rotating shaft of the shutter is prevented from being separated from the U-shaped insertion grooves of the body when the shutter is opened or closed.

Advantageous Effects of Invention

In the optical cable connection module having the function of preventing the separation of the shutter according to the present invention, the cover includes the protruding members having the protrusions provided on both front sides of a top end, and the protrusions are configured to cross an upper opened portion of the insertion grooves of the body. In the state in which the body and the cover are combined, the protrusions on the front side of the protruding members of the cover prevent the opening of an upper portion of the insertion grooves of the body into which the rotating shaft of the shutter is inserted. Accordingly, while the shutter is opened or closed, the rotating shaft of the shutter can be prevented from being separated from the insertion grooves of the body, and thus alien substances can be prevented from entering the body because of the separation of the shutter. Furthermore, the wedge-shaped elastic member has the protruding members provided on both front sides of a top end and closely adhered to a top surface of the shutter. In the state in which the wedge-shaped elastic member is coupled to the body, the protruding members press the top surface of the shutter. Accordingly, the rotating shaft of the shutter can be prevented from being separated from the insertion grooves of the body while the shutter is opened or closed, and thus alien substances can be prevented from entering the body because of the separation of the shutter.

Figure 1:
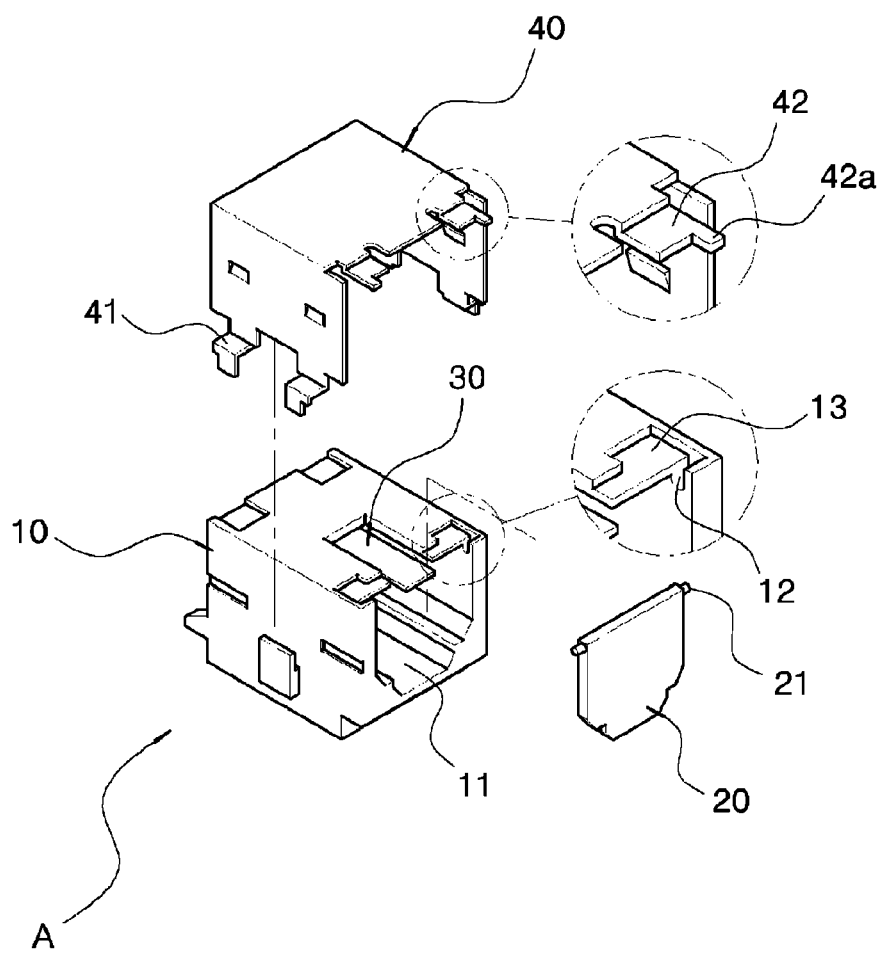
FIG. 1 is an exploded perspective view of an optical cable connection module having a function of preventing separation of a shutter and having a cover coupled to a body according to a first embodiment of the present invention.

DESCRIPTION OF REFERENCE NUMERALS OF PRINCIPAL ELEMENTS IN THE DRAWINGS 10, 10': body 11, 11': cable insertion hole
12, 12': insertion grooves 13: placing grooves
20, 20': shutter 21, 21': rotating shaft
30, 30': elastic member 31: protruding members
40: cover 41: fixing members
42: protruding members 42a: protrusions
100: optical cable A: optical cable connection module

BEST MODE FOR CARRYING OUT THE INVENTION

Hereinafter, some embodiments of the present invention are described in detail with reference to the accompanying drawings.

As shown in FIG. 1, an optical cable connection module A having a function of preventing separation of a shutter according to a first embodiment of the present invention includes a body 10, a shutter 20, an elastic member 30, and a cover 40.

The body 10 has an optical device (not shown inserted therein in the rear of a cable insertion hole 11 into which an optical cable 100 is inserted and has insertion grooves 12 provided on a top end on both sides of the cable insertion hole 11.

The construction of the body 10 is a typical one in the optical cable connection module, and a detailed description thereof is omitted.

It is preferred that placing grooves 13 be provided in the rear of the insertion grooves 12 of the body 100 and downwardly more depressed than other parts on a top surface of the body 10.

Figure 2:
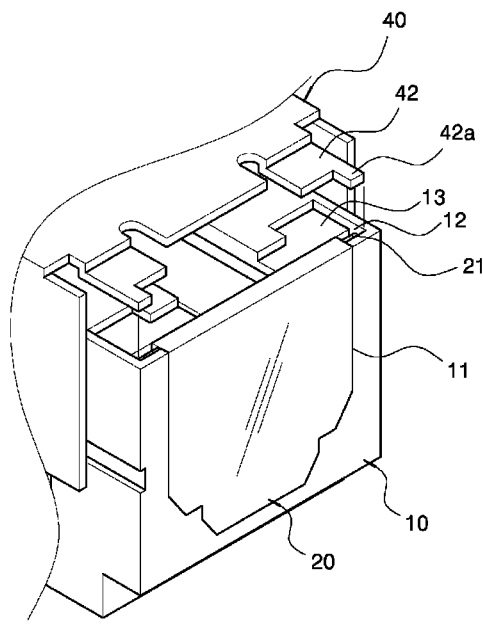
FIG. 2 is a perspective view illustrating a state in which the body and the cover are combined in the optical cable connection module having the function of preventing the separation of the shutter according to the first embodiment of the present invention.

Since the placing grooves 13 downwardly more depressed than other parts on the top surface of the body 10 are provided in the rear of the insertion grooves 12 of the body 100, the protruding members 42 of the cover 40 are received in the placing grooves 13 when the body 10 and the cover 40 are combined as shown in FIG. 2. Accordingly, the protrusions 42a of the protruding members 42 of the cover 40 may be accurately placed on the upper opened portions of the insertion grooves 12 of the body 10.

The shutter 20 is mounted on the cable insertion hole 11 of the body 10 and configured to open and close the cable insertion hole 11. The shutter 20 has a rotating shaft 21 provided on its both upper sides.

The rotating shaft 21 of the shutter 20 has the same diameter as the insertion grooves 12 of the body 10.

Since the rotating shaft 21 of the shutter 20 has the same diameter as the insertion grooves 12 of the body 10, the rotating shaft 21 can rotate without fluctuation front and rear when it rotates in the insertion grooves 12.

The elastic member 30 is fixed to an upper inner portion of the body 10 and configured to support the rear of the shutter 20.

The elastic member 30 is formed in a sheet shape.

The front end of the elastic member 30 on the rear side is inserted into the upper inner portion of the body 10, thereby fixing the elastic member 30. The front end of the elastic member 30 on the front side is closely adhered to the rear of the shutter 20, thereby supporting the shutter 20.

The cover 40 is coupled to the body 10 in such a way as to surround the plane and both sides of the body 100. The cover 40 includes the protruding members 42 having the respective protrusions 42a formed on both top sides on the front side of the body 10. The protrusions 42a are formed to cross the upper opened portion of the insertion grooves 12 of the body 10.

It is preferred that fixing members 41 for fixing the body 10 to a substrate 10 be provided on both bottom sides of the cover 40. Accordingly, the body 10 can be fixed to the substrate by a simple task of fixing the fixing members 41 of the cover 40 to the substrate.

Figure 4:
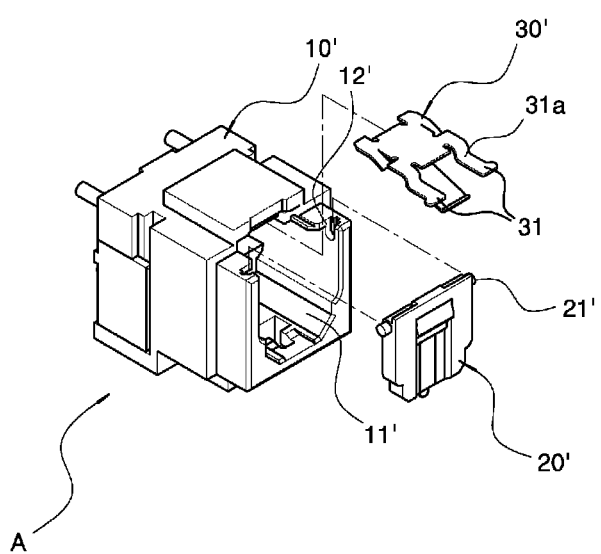
FIG. 4 is an exploded perspective view of an optical cable connection module having a function of preventing separation of a shutter and having a wedge-shaped elastic member coupled to a body according to a second embodiment of the present invention.

As shown in FIG. 4, an optical cable connection module A having a function of preventing separation of a shutter according to a second embodiment of the present invention includes a body 10', a shutter 20', and an elastic member 30'.

Like the body 10 of the first embodiment, the body 10' has an optical device (not shown embedded therein in the rear of a cable insertion hole 11' into which an optical cable 100 is inserted. Insertion grooves 12' are provided a top end on both sides of the cable insertion hole 11'. Like the shutter 20 of the first embodiment, the shutter 20' is mounted on the cable insertion hole 11' of the body 10' and configured to open and close the cable insertion hole 11'. The shutter 20' has a rotating shaft 21' provided on both sides, and a detailed description thereof is omitted.

Like the elastic member 30 of the first embodiment, the elastic member 30' is fixed and installed in an upper inner portion of the body 10' and configured to support the rear of the shutter 20'.

However, unlike the elastic member 30 of the first embodiment, the elastic member 30' of the second embodiment includes protruding members 31. The protruding members 31 have a wedge shape and have central portions bent. The protruding members 31 are closely adhered to the top surface of the shutter 20' on both front sides of the top end of the elastic member 30.

It is preferred that in the elastic member 30', bent portions 31a be provided at respective middle portions on the top end of the protruding members 31.

Since the bent portions 31a are provided at the respective middle portions on the top end of the protruding members 31, elasticity can be applied to the protruding members 31 up and down, and thus the shutter 20' can be smoothly opened or closed even in the state in which the protruding members 31 press the top surface of the shutter 20'.

In the optical cable connection module A having the function of preventing the separation of the shutter according to the second embodiment of the present invention, the prevention of separation of the shutter 20 is described in detail below in connection with the first embodiment in which the cover 40 is coupled to the body 10.

In the state in which the rotating shaft 21 of the shutter 20 has been inserted into the insertion grooves 12 of the body 10 in the first embodiment of the present invention, if the optical cable 100 is inserted into the cable insertion hole 11 of the body 10, the rotating shaft 21 of the shutter 20 is rotated toward the inside of the body 10 in the insertion grooves 12 of the body 10, thereby opening the shutter 20. Accordingly, the cable insertion hole 11 is opened.

Figure 3A:
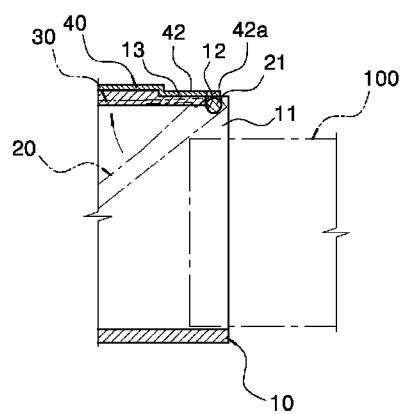
FIG. 3 is a cross-sectional view illustrating the function of preventing the separation of the shutter while opening and closing a cable insertion hole through the cover in the optical cable connection module having the function of preventing the separation of the shutter according to the first embodiment of the present invention.

The protrusions 42a provided on the front side of the protruding members 42 of the cover 40 and received in the placing grooves 13 of the body 10 are formed to cross the upper portion of the insertion grooves 12 of the body 10 into which the rotating shaft 21 of the shutter 20 is inserted as shown in FIG. 2. Although the protrusions 42a are lifted upwardly from the insertion grooves 12 in the process of the rotating shaft 21 rotating in the insertion grooves 12 of the body 10, the top end of the rotating shaft 21 comes in contact with a bottom surface of the protrusions 42a provided in the protruding members 42 of the cover 40 as shown in FIG. 3a and thus the protrusions 42a are prevented from being further lifted. While the shutter 20 is opened, the rotating shaft 21 of the shutter 20 rotates only in the insertion grooves 12 of the body 10, but does not deviate from the insertion grooves 12 of the body 10. Accordingly, the shutter 20 can be prevented from being separated from the cable insertion hole 11 in the process of the shutter 20 being opened.

Figure 3B:
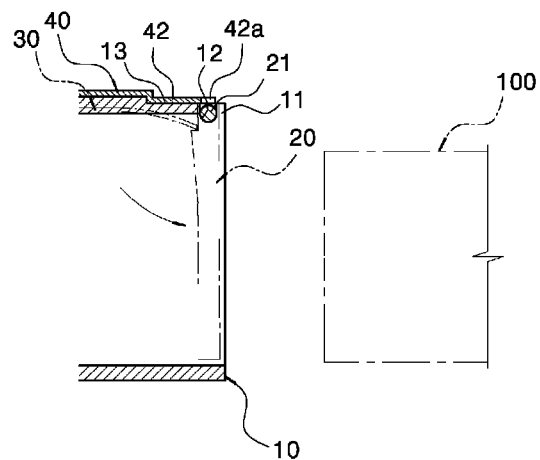

Meanwhile, the top end of a rear of the shutter 20 is supported by the elastic member 30 of a sheet shape. When the shutter 20 is opened, the elastic member 30 of a contraction state switches to an extension state as shown in FIG. 3b at the moment when the optical cable 100 is separated from the cable insertion hole 11. Accordingly, the rotating shaft 21 is rotated outside the body 10 within the insertion grooves 12 of the body 10 by means of elasticity according to the extension of the elastic member 30, and thus the shutter 20 is closed. Although the rotating shaft 21 rotated within the insertion grooves 12 is upwardly lifted from the insertion grooves 12 in the process of the shutter 20 being closed, the top end of the rotating shaft 21 comes in contact with a bottom surface of the protrusions 42a of the protruding members 42 of the cover 40, as in the process of the shutter 20 being opened and thus prevented from being further lifted. Even in the process of the shutter 20 being closed, the rotating shaft 21 of the shutter 20 rotates only within the insertion grooves 12 of the body 10, but does not deviate from the insertion grooves 12 of the body 10. Accordingly, the shutter 20 can be prevented from being separated from the cable insertion hole 11 in the process of the shutter 20 being closed.

Next, in the optical cable connection module A having the function of preventing the separation of the shutter according to the present invention, the prevention of separation of the shutter 20' is described in detail below in connection with the second embodiment in which the elastic member 30' of a wedge shape is coupled to the body 10'.

In the state in which the rotating shaft 21' of the shutter 20' has been inserted into the insertion grooves 12' of the body 10', when the optical cable 100 is inserted into the cable insertion hole 11' of the body 10', the rotating shaft 21' of the shutter 20' rotates toward the inside of the body 10' within the insertion grooves 12' of the body 10' and thus the shutter 20' is opened, as in the first embodiment. Accordingly, the cable insertion hole 11' is opened.

Figure 5:
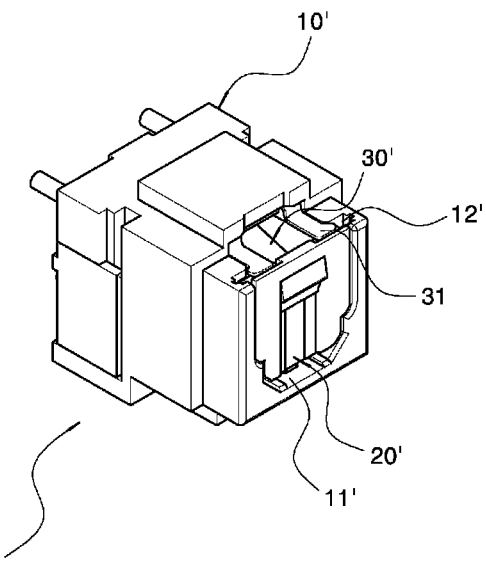
FIG. 5 is a perspective view illustrating a state in which the body and the wedge-shaped elastic member are combined in the optical cable connection module having the function of preventing the separation of the shutter according to the second embodiment of the present invention.
Figure 6:
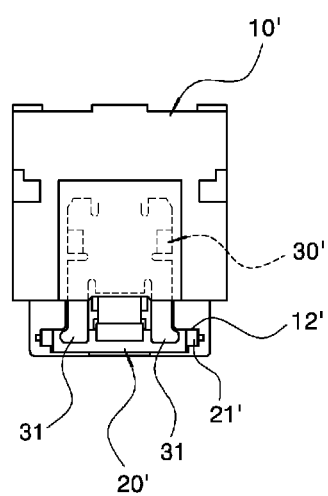
FIG. 6 is a plan view illustrating a state in which the body and the wedge-shaped elastic member are combined in the optical cable connection module having the function of preventing the separation of the shutter according to the second embodiment of the present invention.
Figure 7A:
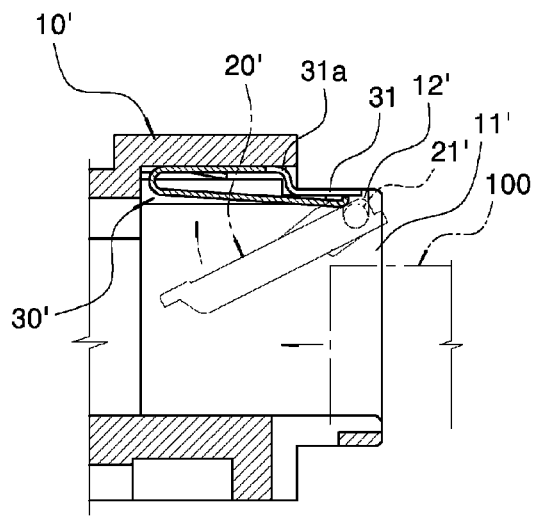
FIG. 7 is a cross-sectional view illustrating the function of preventing the separation of the shutter while opening and closing a cable insertion hole through the wedge-shaped elastic member in the optical cable connection module having the function of preventing the separation of the shutter according to the second embodiment of the present invention.

The protruding members 31 provided at the front end of the elastic member 30' of a wedge shape and fixed to the upper inner portion of the body 10 are configured to press the top surface of the shutter 20' as shown in FIGS. 5 and 6. Although the insertion grooves 12' are upwardly lifted while the rotating shaft 21' of the shutter 20' is rotated within the insertion grooves 12' of the body 10', the top of the shutter 20' is pressed against a bottom surface of the protruding members 31 of the elastic member 30', as shown in FIG. 7a, and prevented from being further lifted. During the time for which the shutter 20' is opened, the rotating shaft 21' of the shutter 20' rotates only within the insertion grooves 12' of the body 10', but does not deviate from the insertion grooves 12' of the body 10'. Accordingly, in the process of the shutter 20' being opened, the shutter 20' can be prevented from being separated from the cable insertion hole 11'.

Figure 7B:
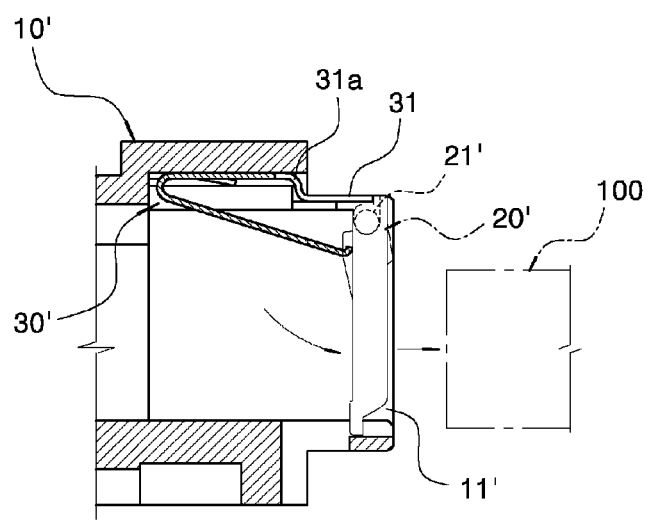

Meanwhile, the top end of the rear of the shutter 20' is supported by the lower front end of the wedge-shaped elastic member 30'. When the shutter 20' is opened, the wedge-shaped elastic member 30' of a contraction state switches to an extension state at the moment when the optical cable 100 is separated from the cable insertion hole 11', as shown in FIG. 7b. Accordingly, the rotating shaft 21' is rotated outside the body 10' within the insertion grooves 12' of the body 10' by means of the extension of the wedge-shaped elastic member 30', thereby closing the shutter 20'. Although the rotating shaft 21' rotated within the insertion grooves 12' is lifted upwardly from the insertion grooves 12' in the process of the shutter 20' being closed, the top surface of the shutter 20' comes in contacts with the bottom surface of the protruding members 31 of the wedge-shaped elastic member 30', as in the process of the shutter 20' being opened, and prevented from being further lifted. Even in the process of the shutter 20' being closed, the rotating shaft 21' of the shutter 20' rotates only within the insertion grooves 12' of the body 10', but does not deviate from the insertion grooves 12' of the body 10'. Accordingly, the shutter 20' can be prevented from being separated from the cable insertion hole 11' even in the process of the shutter 20' being closed.

While the invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. An optical cable connection module having a function of preventing a separation of a shutter, comprising:
   a body configured to have an optical device embedded therein and have U-shaped insertion grooves provided on both sides of a top end of a cable insertion hole on a front side;
   the shutter disposed in the cable insertion hole of the body and configured to have a rotating shaft provided on both sides of a to end of the shutter, the rotating shaft being inserted into the U-shaped insertion grooves of the body and rotated around the U-shaped insertion grooves;
   an elastic member disposed in an upper inner portion of the body and configured to have a front end on a front side support a rear of the shutter; and
   a cover coupled to an outside of the body and configured to include protruding members having respective protrusions provided on both front sides of a top end of the cover, the protrusions being formed to cross the U-shaped insertion grooves of the body, wherein when the shutter rotates toward an inside of the body with a rear of the shutter coming in contact with a front end of the elastic member of a sheet shape, the protrusions formed in the protruding members of the cover prevent an upper portion of the U-shaped insertion grooves of the body from being opened, so that the rotating shaft of the shutter is prevented from being separated from the U-shaped insertion grooves of the body when the shutter is opened or closed, wherein placing grooves are formed on both sides of a top surface of the body, coming in contact with the protruding members of the cover, and more depressed than other portions of the top surface of the body, wherein the protruding members of the cover are received in the respective placing grooves.

2. The optical cable connection module of claim 1, wherein fixing members for fixing the body to a substrate are provided on both bottom sides of the cover, so that the body is fixed to the substrate by inserting the fixing members into the substrate.

3. An optical cable connection module having a function of preventing a separation of a shutter, comprising:

a body configured to have an optical device embedded therein and have U-shaped insertion grooves provided on both sides of a top end of a cable insertion hole on a front side;

the shutter disposed in the cable insertion hole of the body and configured to have a rotating shaft provided on both sides of a top end of the shutter, the rotating shaft being inserted into the U-shaped insertion grooves of the body and rotated around the U-shaped insertion grooves;

an elastic member disposed in an upper inner portion of the body and configured to have a front end on a front side support a rear of the shutter; and protruding members configured to have a wedge shape, provided on both front sides of a top end of the elastic member, and closely adhered to a top surface of the shutter, wherein the protruding members are combined with the upper inner portion of the body, and a bottom end of a front side of the elastic member supports a rear of the shutter and simultaneously the protruding members at the bottom end of the front side of the elastic member press the top surface of the shutter, whereby when the shutter is opened or closed, the rotating shaft of the shutter is prevented from being separated from the U-shaped insertion grooves of the body.

4. The optical cable connection module of claim 3, wherein bent portions are provided in a middle of a top end in which the protruding members of the elastic member are provided, so that elasticity is applied to the protruding members of the elastic member up and down.

* * * * *